(12) United States Patent
Benner et al.

(10) Patent No.: US 6,963,409 B2
(45) Date of Patent: Nov. 8, 2005

(54) OPTICAL POSITION MEASURING DEVICE

(75) Inventors: Ulrich Benner, Trostberg (DE); Elmar Mayer, Nussdorf (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 0 days.

(21) Appl. No.: 10/510,868

(22) PCT Filed: Apr. 2, 2003

(86) PCT No.: PCT/EP03/03421

§ 371 (c)(1),
(2), (4) Date: Oct. 7, 2004

(87) PCT Pub. No.: WO03/087706

PCT Pub. Date: Oct. 23, 2003

(65) Prior Publication Data

US 2005/0168757 A1 Aug. 4, 2005

(30) Foreign Application Priority Data

Apr. 17, 2002 (DE) ................. 102 17 726

(51) Int. Cl.[7] .............. G01B 11/14; G01B 11/02
(52) U.S. Cl. ............. 356/616; 356/614; 250/559.29; 250/237 G; 250/201.5
(58) Field of Search ............... 356/614–623, 356/494, 499, 488; 250/201.5, 237 G, 231.14, 250/237.6, 227.19, 559.29, 559.44; 359/368–371

(56) References Cited

U.S. PATENT DOCUMENTS

| | | | |
|---|---|---|---|
| 4,837,588 A * | 6/1989 | Imakawa et al. | 347/250 |
| 4,924,079 A * | 5/1990 | Opheij et al. | 250/201.5 |
| 5,148,322 A * | 9/1992 | Aoyama et al. | 359/708 |
| 5,251,012 A | 10/1993 | Riegger et al. | |
| 5,360,970 A * | 11/1994 | Kay | 250/201.5 |
| 5,659,420 A * | 8/1997 | Wakai et al. | 359/368 |
| 5,774,219 A | 6/1998 | Matsuura | |
| 6,097,490 A * | 8/2000 | Holzapfel et al. | 356/614 |

(Continued)

FOREIGN PATENT DOCUMENTS

DE  100 22 619 A1  12/2001

(Continued)

*Primary Examiner*—Gregory J. Toatley, Jr.
*Assistant Examiner*—Sang H. Nguyen
(74) *Attorney, Agent, or Firm*—Brinks Hofer Gilson & Lione

(57) ABSTRACT

An optical position measuring system including a periodic grating structure and a scanning unit. The scanning unit includes a light source that directs light towards the periodic grating structure and an optical lens device that receives light from the periodic grating structure and creates an image of the periodic grating structure in an image plane, the optical lens device having a periodic lens array with a grating period, $A_G(r)$ or the mutual distance between adjoining lenses of said lens array defined by the equation:

$$A_G(r) = \frac{|\beta(r)| * [t(r) * [k+i+n] + \psi]}{(|\beta(r)|+1)}$$

wherein
  $A_G(r)$ is the grating per
  $t(r)$ the period of the periodic grating structure,
  $|\beta(r)|$ the absolute amount of the image magnification factor $\beta$ of the lens array
  $\Psi$ a presettable defined phase shift
  r the radius of the grating arrangement, wherein in the case of a linear grating $r=\infty$ and $A_{G,t}$ and $|\beta|$ are constants,
  i, k, n ∈ N, i.e. are natural numbers, including zero.

13 Claims, 5 Drawing Sheets

U.S. PATENT DOCUMENTS

| | | |
|---|---|---|
| 6,172,753 B1 | 1/2001 | Wagner |
| 6,198,534 B1 * | 3/2001 | Hofer et al. ............... 356/399 |
| 6,552,810 B1 * | 4/2003 | Hermann et al. ........... 356/614 |
| 2004/0118758 A1 | 6/2004 | Gordon-Ingram |
| 2004/0119989 A1 | 6/2004 | Mayer et al. |

FOREIGN PATENT DOCUMENTS

| | | |
|---|---|---|
| EP | 0 470 420 A1 | 2/1992 |
| GB | 2 056 660 A | 3/1981 |
| WO | WO 02/084223 A1 | 10/2002 |

* cited by examiner

Fig. 5
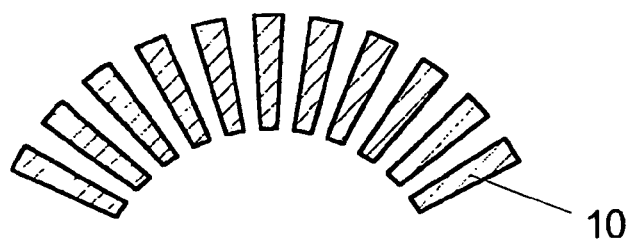
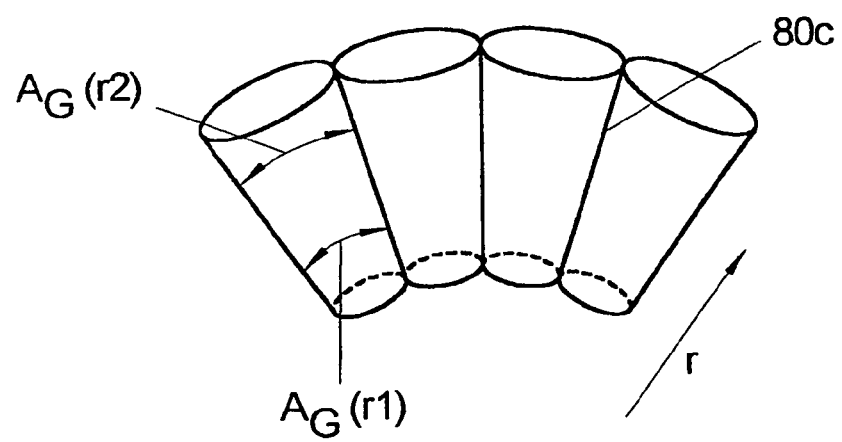
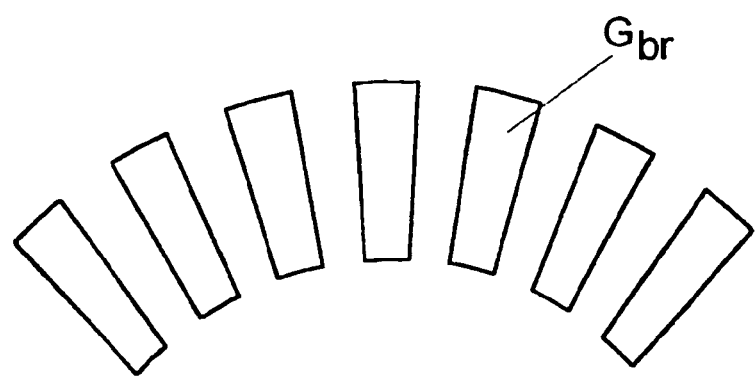

OPTICAL POSITION MEASURING DEVICE

Applications claim, under U.S.C. §§ 120 and 365, the benefit of priority of the filing date of Apr. 2, 2003 of a Patent Cooperation Treaty patent application, copy attached, Ser. No. PCT/EP03/03421, filed on the aforementioned date, the entire contents of which are incorporated herein by reference, wherein Patent Cooperation Treaty patent application Ser. No. PCT/EP03/03421 was not published under PCT Article 21(2) in English.

Applicants claim, under 35 U.S.C. § 119, the benefit of priority of the filing date of Apr. 17, 2002 of a German patent application, copy attached, Ser. No. 102 17 726.0, filed on the aforementioned date, the entire contents of which are incorporated herein by reference.

BACKGROUND OF THE INVENTION

1. Field of the Invention

The invention relates to an optical position measuring system

2. Description of the Related Art

Optical position measuring systems contain a scanning unit and a scale which is movable relative to the scanning unit in the measuring direction, and on which one grating or several gratings of a periodic grating structure is or are arranged between the scale and the scanning unit for an incremental or absolute measurement of the relative movement between the scale and the scanning unit. The scanning unit includes a part on the transmitting side, having a light source arranged on a board, preferably a light-emitting diode, and an optical collimator device assigned to the light source. A photoelectric detector or photo sensor with different active radiation-sensitive detector areas is arranged on the board in the part of the scanning unit on the receiving side.

The precision and quality of the measurements, the insensitivity to contamination or soiling and mechanical changes of the scale, the structural size, as well as the manufacturing costs of an optical measuring system of the above mentioned type depend to a crucial extent on the type and quality of the optical lens arrangement employed in the scanning unit, which creates an image of the scale grating on the radiation-sensitive periodical detector areas. Therefore the structural size of the scanning unit primarily determines the size of the optical position measuring system. The cost of manufacturing is determined to a large extent by the costs of the photoelectric detector, which can be produced in a cost-effective manner if it can be employed in connection with different measuring methods.

The so-called "transmitted light measuring method", for one, is employed as the measuring method for optical position measurements, wherein the light source, the optical lens arrangement and the scanning plate are arranged on one side, and the photoelectric detector on the other side of the scale and, on the other hand, the so-called "incident light measuring method" is used, wherein the light source, the optical lens arrangement, the scanning plate and the photoelectric detector are arranged on one side of the scale. Making a photoelectric detector available which could be suitable for both methods would allow the production of large numbers and therefore low production costs. However, this requires a special intervention in the path of the scanning beams because, different from the transmitted light measuring method, where the photoelectric detector can be arranged directly next to the scale for detecting the periodic grating structure, with the incident light measurement method the photoelectric detector is arranged farther away from the scale, so that a special optical imaging device is required for creating a sharp image of the scale grating on the periodic radiation-sensitive detector areas for imaging the periodic scale grating on the photoelectric detector with a defined image magnification factor.

For example, the required optical imaging device can be realized with a single lens which, however, because of the required large image field, is of a correspondingly large size and cannot be considered for as compact as possible a scanning unit.

An optical imaging device in the scanning unit of an optical position measuring system is known from GB 2 056 660, which is embodied in the manner of a lens array. The optical imaging device contains a light-emitting diode arranged in a first chamber, from which light beams are emitted through a condenser lens toward the scale, and are reflected by the latter by an optical lens device also embodied as a condenser lens to a light sensor provided in a second chamber arranged next to the first chamber. In principle it is possible to embody a total system of smaller size by an optical imaging device designed as a lens array.

However, GB 2 056 660 does not contain any suggestions as to how such a lens array is to be actually designed as an optical image device in the scanning beam path of an optical position measuring system, in particular, if a defined image magnification factor has been preset, by which a periodic scale grating, for example, is to be imaged on a periodic detector arrangement.

SUMMARY AND OBJECTS OF THE INVENTION

An object of the present invention is based on disclosing a specification for the design of a compactly designed lens array, which can be used as universally as possible and which images a periodic grating with a predetermined image magnification factor on an image plane in the scanning beam path of an optical position measuring system.

In accordance with the present invention, this object is attained by an optical position measuring system including a periodic grating structure and a scanning unit. The scanning unit includes a light source that directs light towards the periodic grating structure and an optical lens device that receives light from the periodic grating structure and creates an image of the periodic grating structure in an image plane, the optical lens device having a periodic lens array with a grating period. $A_G(r)$ or the mutual distance between adjoining lenses of said lens array defined by the equation:

$$A_G(r) = \frac{|\beta(r)| * [t(r) * [k + i + n] + \psi]}{(|\beta(r)| + 1)}$$

wherein
  $A_G(r)$ is the grating per
  $t(r)$ the period of the periodic rating structure,
  $|\beta(r)|$ the absolute amount of the image magnification factor $\beta$ of the lens array
  $\Psi$ a presettable defined phase shift
  r the radius of the grating arrangement, wherein in the case of a linear grating r=∞ and $A_{G,t}$ and $|\beta|$ are constants,
  i, k, n ∈ N, i.e. are natural numbers, including zero.

In connecting with the imaging of grating structures by lens arrays the problem arises, that each lens or micro-lens generates a local image, so that phase shifts between the images of the grating structures can occur at the image borders during the transition to the adjoining lens. Taking the required image magnification factor into consideration, it is therefore necessary to determine a periodicity of the lens array optimized to the grating period of the grating to be imaged in order to assure in this way that the image of the grating again results in a continuous grating, i.e. a phase-identical overlap or agreement between grating strips and gaps of the grating imaged by the one lens and grating strips and gaps of the adjoining grating.

The attainment of the object provides a universally applicable specification for the design of a lens array of compact size which images a periodic grating of a predetermined image magnification factor on an image plane in the scanning beam path of an optical position measuring system.

The attainment of the object is based on the recognition that, compared with individual lenses, lens arrays, and in particular the linear, periodic arrangement of identical lenses in a defined pattern, have the advantage of short focal length and low structural size, simultaneously along with large illuminated areas in connection with the optical image.

Although the optical lens arrangement known from GB 2 056 660 can be considered to be a lens array, given an arrangement of several light-emitting diodes and light-sensitive sensors with the associated condenser lenses, because of the lack of a geometric assignment of the optical lens device to the periodicity of the grating structure of the scale and the scale of the image, it is not possible to gather from such a lens array how the highly accurate image of the scale grating required for precise measurement on the image plane or a photoelectrical detector should take place.

If such a phase-identical overlap is assured by an appropriate regularity in the determination of the optimized distance between adjoining lenses, and therefore an optimized periodicity of the lens arrangement while taking preset geometric marginal conditions into consideration, it is also assured that the photoelectric detector scanning the—undisturbed—grating imaged in the image plane, or an optical relay system, generates exact position or movement signals.

Accordingly, the attainment of the object in accordance with the present invention is composed of a combination of an optical lens device formed from a periodic lens array and the determination of an optimal mutual distance between adjoining lenses, or an optimal grating period of the periodic lens array.

The dimensioning rule for the periodicity A(r) of the lens array in the general form, valid for linear, as well as for radial position measuring device, is:

$$A_G(r) = \frac{|\beta(r)| * [t(r) * [k + i + n] + \psi]}{(|\beta(r)| + 1)}$$

wherein $A_G(r)$ is the grating period of the lens array,
t(r) the period of the periodic grating structure,
$|\beta(r)|$ the absolute amount of the image magnification factor $\beta$ of the lens array (80)
$\Psi$ a presettable defined phase shift
r the radius of the grating arrangement, wherein in the case of a linear grating r=∞, and $A_G$, t and $|\beta|$ are constants,
i, k, n ∈ N, i.e. are natural numbers, including zero.

This dimensioning rule for the mutual distance $A_G$ (r) of adjoining lenses also takes the possibility into account of generating defined phase shifts $\Psi$ in the generated images of adjoining lenses, so that the dimensioning rule images the general case of the determination of the grating period $A_G(r)$ of a periodic linear or radial lens array while taking predetermined geometric marginal conditions into consideration.

It is possible by a specifically settable phase shift $\Psi$ in the image areas of adjoining lenses of the lens array to determine the phase relation of signals which, for example, are generated by photoelectric detectors arranged in the image plane. By this it is possible, inter alia, to generate signals electrically offset by 90° for evaluating a position measurement.

Furthermore, by a phase shift $\Psi$ in the overlapping area of the images of adjoining lenses of the lens array it is possible to set a specific relationship between the widths of the light and dark areas, by which the harmonic wave content of the signals of a photoelectric detector obtained from the widths of the light and dark areas can be specifically affected.

Since the phase relationships between the registered scanning signals of the respectively assigned detectors are often set with the aid of structured scanning plates, it is often possible with a lens array laid out in this way to omit a structured scanning plate in the scanning beam path of an optical position measuring system.

With a linear position measuring system, the above cited dimensioning rule for the periodicity $A_G$ of the lens array becomes $$A_G = \frac{|\beta| * [t * [k + i + n] + \psi]}{(|\beta| + 1)}$$

wherein $A_G$ is the grating period of the lens array,
t the period of the periodic grating structure,
$|\beta|$ the absolute amount of the image magnification factor $\beta$ of the lens array (80)
$\Psi$ a presettable defined phase shift
i, k, n ∈ N, i.e. are natural numbers, including zero.

The phase shift is preferably a fraction or a multiple of the period of the periodic grating structure imaged in the image plane.

In the case of imaging a periodic grating structure without resulting phase shifts between the images of adjoining lenses, the grating period is to be determined from the following dimensioning rule $$A_G(r) = \frac{|\beta(r)| * t(r) * [k + i + n]}{(|\beta(r)| + 1)}$$

wherein $A_G(r)$ is the grating period of the lens array,
t(r) the period of the periodic grating structure,
$|\beta(r)|$ the absolute amount of the image magnification factor $\beta$ of the lens array (80)
r the radius of the grating arrangement, wherein in the case of a linear grating r=∞, and $A_G$, t and $|\beta|$ are constants,
i, k, n ∈ N, i.e. are natural numbers, including zero.

This dimensioning rule for the design of a lens array can also be employed in linear, as well as radial, position measuring system. For the imaging of the periodic grating structure without resulting phase shifts between the images of adjoining lenses, the grating period for a linear position measuring system is $$A_G = \frac{|\beta| * t * [k + i + n]}{(|\beta| + 1)}$$

wherein
- $A_G$ is the grating period of the lens array,
- t the period of the periodic grating structure,
- $|\beta|$ the absolute amount of the image magnification factor $\beta$ of the lens array (80)
- i, k, n ∈ N, i.e. are natural numbers, including zero.

In order to take physical and/or technical marginal conditions into consideration in the determination of an optimal distance between adjoining lenses or micro-lenses, such as a numerical aperture, as well as technological restrictions, the width of the lenses of the lens array can be determined from the equation $$B_L(r) = \frac{|\beta(r)| * t(r) * m}{(|\beta(r)| + 1)}$$

wherein
- $B_L$ (r) the lens width
- t(r) the period of the periodic grating structure,
- $|\beta(r)|$ the absolute amount of the image magnification factor $\beta$ of the lens array (80)
- r the radius of the grating arrangement, which for r=∞ defines a linear grating, for which $B_L$ $\beta$ and t are constants,
- m ∈ N.

This dimensioning rule results in a minimal lens width in the course of determining an optimal periodicity of the image grating of a linear or radial lens array.

For determining an optimal distance between adjoining lenses or micro-lenses of a linear position measuring system, taking into consideration physical and/or technical marginal conditions, as well as technological restrictions, the width of the lens is determined from the equation $$B_L = \frac{|\beta| * t * m}{(|\beta| + 1)}$$

The attainment of the object of the present invention can be used for the direct imaging of a periodic scale grating, as well as in the scanning beam path of an optical position measuring system wherein, for example in an intermediate plane, a "virtual" strip pattern is generated by the interaction of several previously passed-through grating graduations, and the imaging of such a virtual strip pattern with a defined image magnification factor is required in an image plane.

A photoelectric sensor can also be selectively arranged in the image plane of the lens array provided with an optimal periodicity of the imaged grating structure, or the image plane can be assigned to an optical relay system.

The use of a periodic lens array, whose grating period is determined in accordance with the dimensioning rule in accordance with the present invention, provides the conditions for the use of identical, or structurally identical detector systems or optical relay systems of optical position measuring systems operating in accordance with the incident light measuring method or the transmitted light measuring system, and therefore for the cost-effective manufacture of corresponding optical measuring systems. In connection with this the possibility also arises that linear and periodic lens arrays designed in accordance with the present invention in an optical measuring system are used for photoelectrical scanning in accordance with the incident light measuring method, and that the image plane and the light source are arranged on a common printed circuit board.

For generating such a "virtual" strip pattern—for example a so-called Vernier strip pattern—in an intermediate plane of the scanning beam path, a scanning plate with a grating structure with a grating constant which slightly differs from the grating constant of the scale grating can be arranged in the scanning beam path on the side of the scanning unit, so that in a manner known per se the virtual strip pattern is generated from the interaction of the two grating structures in an intermediate image plane, which in turn is imaged via the optical lens arrangement.

An advantageous further development of the attainment of the object in accordance with the present invention is distinguished in that the printed circuit board is arranged at an angle with respect to the plane of the scale or scale pattern in such a way that the light beams emanating from the light source are reflected at a reflecting surface arranged perpendicularly with respect to the scale, are cast on the scale grating via a condenser lens, are reflected there and image the scale grating at the image magnification factor of the image plane via the scanning plate and by the lens array arranged substantially parallel with the printed circuit board.

The basic concept of the present invention will be explained in greater detail by exemplary embodiments represented in the drawings. Shown are in:

BRIEF DESCRIPTION OF THE DRAWINGS

FIG. 5 is a schematic representation of an image of an embodiment of a radial periodic grating structure with a radial lens array to be used with the optical position measuring system of FIG. 1.

DESCRIPTION OF THE PREFERRED
EMBODIMENT(S) OF THE INVENTION

Figure 1:
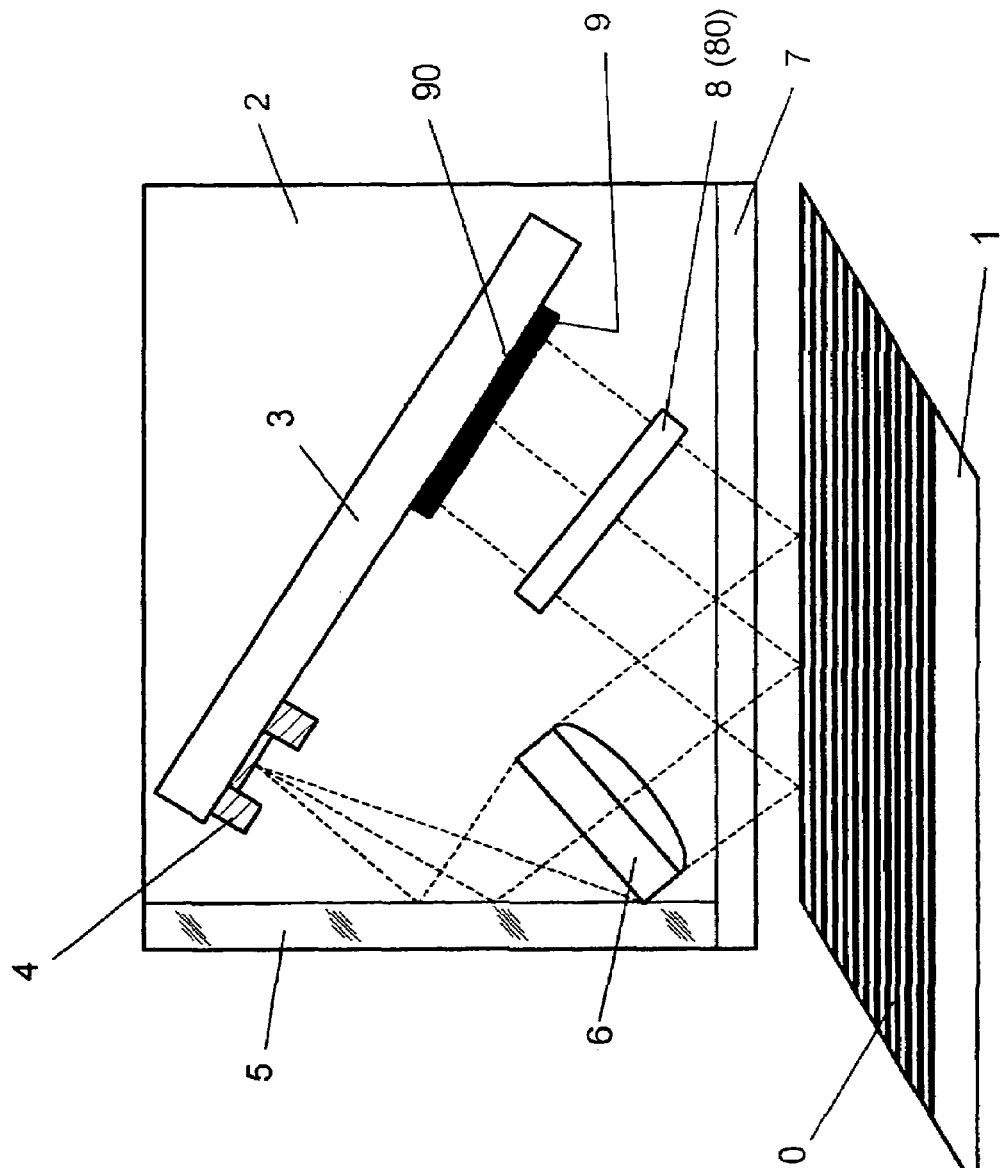
FIG. 1 is a schematic representation of an embodiment of a scale and a scanning unit of an optical position measuring system operating in accordance with the an embodiment of an incident light measuring method in accordance with the present invention.

In a schematic representation, FIG. 1 shows, as parts of an optical measuring system operating in accordance with the incident light measuring method, a scale 1 with a scale grating 10 extending transversely with respect to the scanning direction, and a scanning unit 2, which is movable in relation to the scale 1. The scale grating 10 includes a linear periodic grating which, in the exemplary embodiment in accordance with FIG. 1, is represented as the incremental track of a linear position measuring system. Alternatively, the grating arranged on the scale 1 can be put together from an incremental grating and a grating having a preset graduation period and providing absolute position values.

The scanning unit 2 contains a printed circuit board 3, which is arranged at a preset angle with respect to the plane of the scale 1 in a scanning housing. A light source 4 in the form of a light-emitting diode and, at a distance from the light source 4, a photoelectric detector 9, which alternatingly has radiation-sensitive areas and radiation-nonsensitive gaps whose orientation is matched to the orientation of the scale grating 10, are arranged on the printed circuit board. For example, the photoelectric detector 9 can be embodied in accordance with the structured opto-electronic photo detector known from DE 100 22 619 A1.

The lateral wall of the housing of the scanning unit 2 facing the light source 4 is embodied mirrored as a reflecting surface 5 and reflects the beam emanating from the light source 4 at the scale grating 10 via a condenser lens 6 and a glass plate 7 arranged parallel with the scale 1 and constituting the bottom of the scanning housing.

The glass plate can have a scanning grating with a grating structure which slightly differs from the grating constant of the scale grating, so that a virtual strip pattern—for example a so-called Vernier strip pattern—is created by the interaction of the two grating structures in an intermediate plane and is in turn imaged via the optical lens device.

From the scale grating 10, the light beams reach an optical lens device 8 which, in accordance with the present invention, includes a linear periodic lens array 80. The lens array images the scale grating 10 at a preset image magnification factor $\beta$ on the image plane 9 of the printed circuit board 3, on which a photoelectric detector 90 is arranged in the exemplary embodiment, which converts the light-dark modulations during the relative movement between the scanning unit 2 and the scale 1 into corresponding electrical signals.

In this case, the individual lenses utilized in the optical lens device 8, or the lens array 80, can be designed as refractive or as diffractive optical elements.

Alternatively to the photoelectric sensor represented in FIG. 1, an optical element or an image plane of an optical relay system can also be provided in the image plane 9.

So that the periodic grating structure of the scale grating 10 is assuredly imaged as a periodic continuous grating by the lens array 80 in the image plane 9 with equiphased overlap, i.e. agreement of grating strips and gaps of the portion of the scale grating imaged by the one lens of the lens array 80, with the grating strips and gaps of the portion of the scale grating 10 imaged by the adjoining lens, the lens array 80 must have a defined periodicity, while taking into consideration the image magnification factor $\beta$ and the effective grating period of the scale grating 10. The dimensioning rule for determining an optimal periodicity of the lens array will be mathematically determined in what follows with the aid of the schematic representation in FIG. 2, in which two adjoining lenses 81, 82 of a linear lens array 80 for imaging a scale grating 10 in an image plane 9 are represented.

Figure 2:
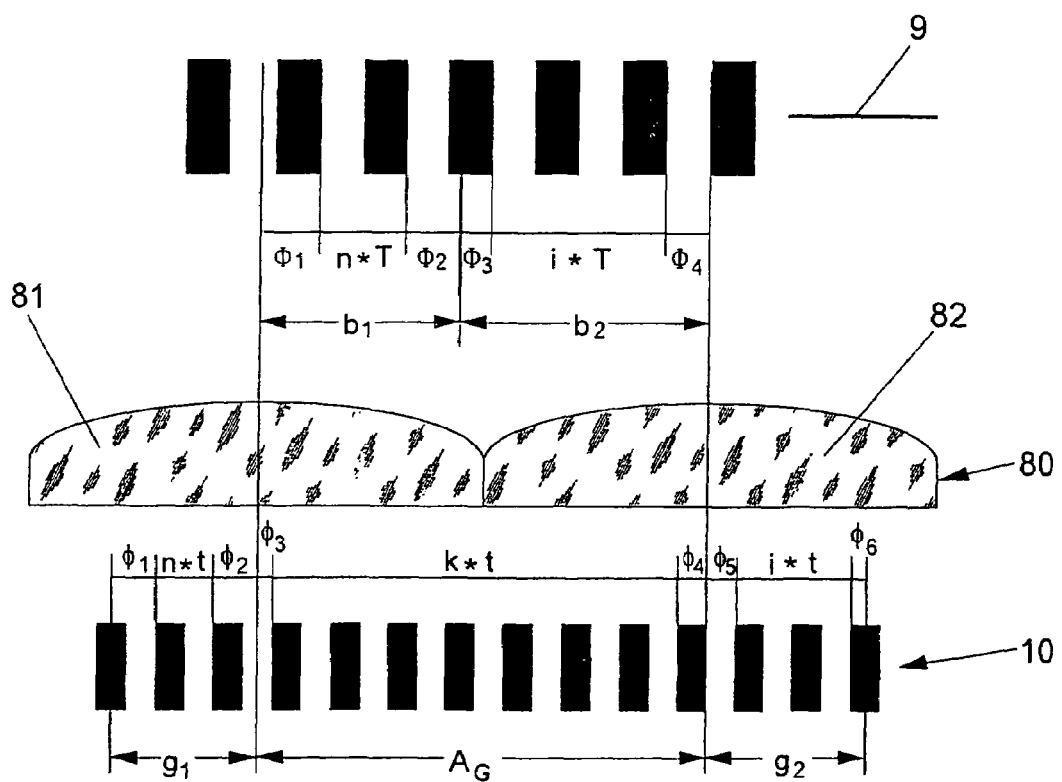
FIG. 2 is a schematic representation of an embodiment of two adjoining lenses of a linear periodic lens array for generating an image of a periodic grating structure to be used with the position measuring system of FIG. 1.

FIG. 2 shows in a portion of a linear lens array 80 two adjoining lenses 81, 82 of the lens array 80, which are arranged at a lens distance $A_G$ with respect to each other and which image the scale grating 10 applied to a scale, which has a grating period t, at the image magnification factor $\beta$ on a grating of the period $T=\beta*t$ in the image plane 9, in which, for example, a photoelectric detector 90 in accordance with FIG. 1 is arranged, or which is assigned to an optical relay system.

The portion of the scale grating 10 assigned to the lenses 81, 82 of the lens array 80 includes the distance quantities $g_1$, $g_2$ and the distance $A_G$ of the adjoining lenses 81, 82 and is composed of multiples of the grating period t and "remaining amounts" $\phi_1$ to $\phi_6$, which are smaller than the grating period t. Here, the left lens 81 of the lens array 80 changes the grating sequence of the distance quantity $g_1$ of the scale grating 10 into an image sequence of the distance quantity $b_1$ in the image plane 9, and the right lens 82 of the lens array 80 changes the grating sequence $g_1$ into the image sequence of the distance quantity $b_2$ in the image plane 9, wherein the image of the scale grating 10 in the image plane 9 includes the distance quantities $b_1$ and $b_2$ and is composed of multiples of the grating period T and "remaining amounts" $\Phi_1$ to $\Phi_4$, which are smaller than the grating period T.

So that the gratings represented by the lenses 81, 82 of the lens array 80 in the image plane 9 are completed in an equiphased manner into a continuous grating or overlap, the following conditions apply:

$$A_G = b_1 + b_2 = \Phi_1 + \Phi_2 + n*T + \Phi_3 + \Phi_4 + i*T \quad (1)$$

$$b_2 = |\beta|*g_2 = |\beta|*(\phi_5 + \phi_6 + i*t) \quad (2)$$

$$b_1 = |\beta|*g_1 = |\beta|*(\phi_1 + \phi_2 + n*t) \quad (3)$$

$$A_G = k*t + \phi_3 + \phi_4 \quad (4)$$

$$\phi_2 + \phi_3 = t \quad (5)$$

$$\phi_4 + \phi_5 = t \quad (6)$$

$$T = \Phi_2 + \Phi_3 = |\beta|*(\phi_1 + \phi_6) \quad (7)$$

$$T = |\beta|*t \quad (8)$$

wherein n, i and k are natural numbers, including zero.

Taking equations (2), (3) and (7) into account, the following results from treating the equations (1) and (4) as being equivalent:

$$|\beta|*(\phi_1 + \phi_2 + *t) + |\beta|*(\phi_5 + \phi_6 + i*t) = k*t + \phi_3 + \phi_4$$

$$|\beta|*(n+i)*t + |\beta|*(\phi_1 + \phi_6) + |\beta|*(\phi_2 + \phi_5) k*t + \phi_3 + \phi_4$$

with $\tau = \Phi_2 + \Phi_3 = |\beta|*(\phi_1 + \phi_6) = |\beta|*t$ it follows that $$|\beta|*(n+i)*t + |\beta|*t + |\beta|*(\phi_2 + \phi_5) = k*t + \phi_3 + \phi_4$$

$$|\beta|*(i+n+1)*t + |\beta|(\phi_2 + \phi_5 = k*t + \phi_3 + \phi_4 \quad (9)$$

If the sum $(\phi_2 + \phi_5)$ is added to the equation (9), the following is obtained from the equations (5) and (6):

$$|\beta|*(i+n+1)*t + |\beta|*(\phi_2 + \phi_5) + = (\phi_2 + \phi_5) = k*t + \phi_3 + \phi_4 + (\phi_2 + \phi_5)$$

$$(|\beta 30\ 1)*(\phi_5 + \phi_2) + |\beta|*t*(i+n+1) = (k+2)*t \text{ or}$$

$$(\phi_2 + \phi_5) = [(k+2)*t - |\beta|*t*(i+n+1)]/(|\beta|+1) \quad (10)$$

If $(\phi_2 + \phi_5)$ is added to the equation (4), the following is obtained:

$$A_G + (\phi_2 + \phi_5) = k*t + \phi_3 + \phi_4 + (\phi_2 + \phi_5)$$

With the equations (5) and (6), it follows that $$A_G = (k+2)*t - (\phi_2 + \phi_5)$$

With the equation (10)

$$A_G = (k+2)*t - [(k+2)*t - |\beta|*t*(i+n+1)]/(|\beta|+1)$$

Finally, from this the solution for the grating period, or the mutual distance of the adjoining lenses 81, 82 of the linear periodic lens array from each other, for imaging a continuous grating composed of partial image gratings, which overlap in an equiphase manner, results:

$$A_G = \frac{|\beta| * t * [k+i+n+3]}{(|\beta|+1)}$$

or $$A_G = \frac{|\beta| * t * [k+i+n]}{(|\beta|+1)} \quad (11)$$

$A_G$ is the grating period of the lens array 80,
t the period of the scale grating 10,
$|\beta|$ the absolute amount of the image magnification factor $\beta$ of the lens array 80, and
i, k, n, natural numbers including the number zero.

In order to optically image a scale grating of the period t with the image magnification factor $\beta$ by the lens array 80 in such a way that a grating of the period $T=|\beta|*t$ is created, which has no phase shifts, phase gaps, therefore the adjoining lenses 81, 82 of the lens array 80 must have a distance $A_G$ in accordance with the above equation (11).

By a phase shift $\Psi$, which can be specifically preset, in the image space between the images from two adjoining lenses 81, 92 of the lens array 80, effects desired for the evaluation of the grating imaged in the image plane 9 can be set. Thus, by the specifically settable phase shift $\Psi$ in the image plane 9, it is possible to determine the phase relation of signals generated by a photoelectric detector 90 in accordance with FIG. 1, for example a multi-field detector, which is arranged in the image plane 9, for example as 90°. Moreover, in the overlap area of the grating images of the adjoining lenses 81, 82 a specific relationship between the width of the light and dark areas can be set, by which the harmonic wave content of the signals from the detector 90 obtained from this can be specifically affected.

For including a desired shift $\Psi$, the above listed equation (1) is merely changed to:

$$A_G = b_1 + b_2 + \Psi = (\Phi_1 + \Phi_2 + n*T + \Phi_3 + \Phi_4 + i*T + \Psi) \quad (1')$$

wherein $\Psi = |\beta|$

From this results the generally applicable form of the grating period or the mutual distance from each other of the adjoining lenses 81, 82 of the linear periodic lens array 80 for imaging a continuous grating composed of partial image gratings, which overlap in an equiphase manner as:

$$A_G = \frac{|\beta| * (t*(k+i+n) + \psi)}{(|\beta|+1)} \quad (12)$$

wherein
$A_G$ is the grating period of the lens array 80,
t the period of the grating structure,
$|\beta|$ the absolute amount of the image magnification factor $\beta$ of the lens array (80)
$\Psi$ a presettable defined phase shift, and
i, k, n are natural numbers, including the number zero.

Therefore, if it is intended to generate a specific phase shift $\Psi$ of, for example, a quarter of the period T of the grating imaged by the lens array 80, the lens distance $A_G$ of adjoining lenses 81, 82, or of the periodicity of the lens array 80 is to be determined in accordance with the above calculating formula (12), taking into consideration the image magnification factor $\beta$ of the lens array 80 and the grating period t of the scale grating 10.

Figure 3:
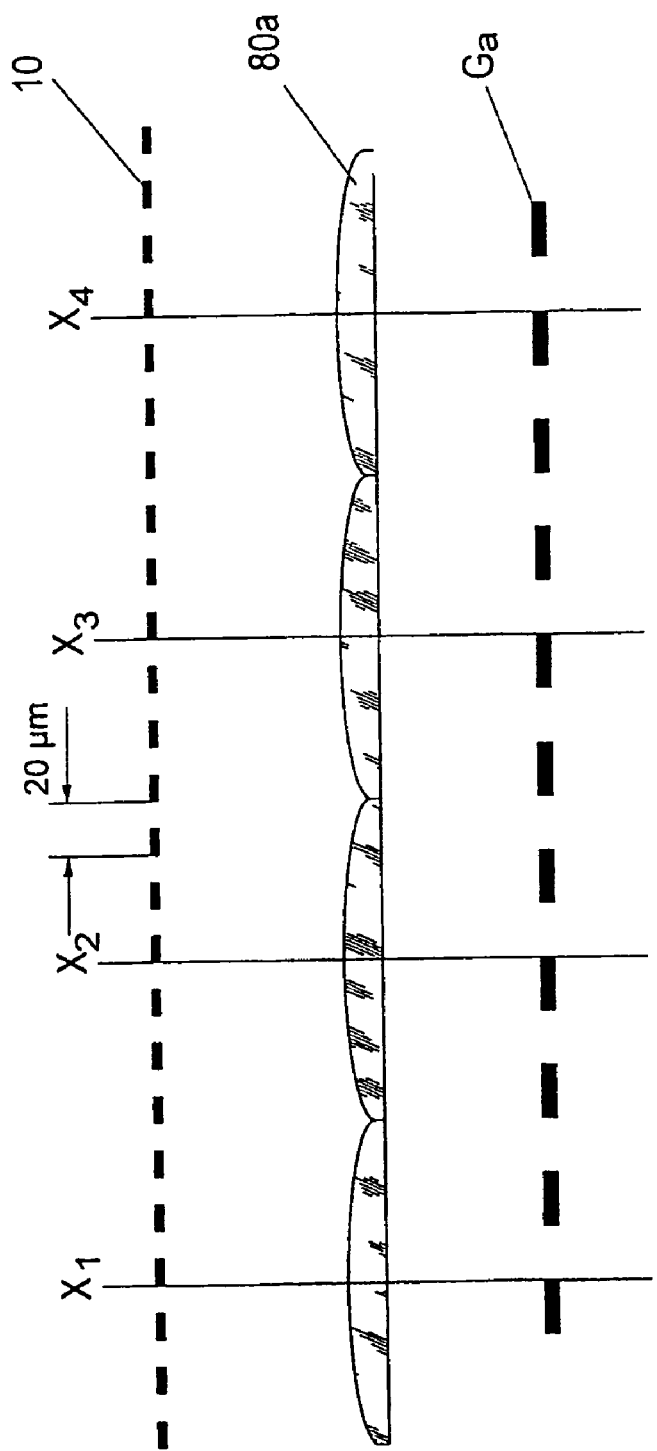
FIG. 3 is a schematic representation of an image of an embodiment of a periodic grating structure to be used with the optical position measuring system of FIG. 1 of a periodicity determined in accordance with the dimensioning rule in accordance with the present invention.

Two grating periods, or mutual distances from each other of adjoining lenses of a linear periodic lens array calculated by the above shown calculating formulas are schematically represented in FIG. 3.

The object to be attained on which the representation in FIG. 3 is based in includes imaging a 20 μm scale grating 10, i.e. a scale grating of the grating period t=20 μm, by an optical image with the aid of a (micro) lens array on a grating with the image magnification factor $\beta=-2$, i.e. a grating period of t'=40 μm. Thus, an image provided with twice the grating period t of the original scale grating 10 is intended to be created without additional phase shifts. Furthermore, for reasons of the numerical aperture, as well as for reasons of technological limitations, a minimum lens width of 120 μm is to be made the basis of the calculation of the periodicity of the lens array.

The following calculating formula (11) is made the basis for the determination of the periodicity, or the distance $A_G$ of adjoining lenses of the lens array 80, wherein $$A_G = |\beta|*t*(k+i+n)/(|\beta|+1) mit\ k,i,n \in N$$

If the equation is resolved in accordance with the natural numbers i, k, n contained in the equations, the following results:

$$A_G*(|\beta|+1)/(|\beta|) = (k+i+n) \quad (13)$$

Since i, k and n are natural numbers, the term m also must be a natural number m, i.e.

$$A_G*(|\beta|+1)/(|\beta|*t) = (k+i+n) = m. \quad (14)$$

The resolution of the equation 14 for the distance $A_G$ of adjoining lenses results in $$A_G = |\beta|*t*m/(|\beta|+1), \text{ with } m \in N. \quad (15)$$

In this equation, t and $\beta$ are givens, so that when predetermining a defined minimum lens width of the distance $A_G$ between adjoining lenses, the natural number m must be selected in such as way that the distance $A_G$ between adjoining lenses reaches the desired value of the minimum lens distance. In this case the value of the natural number m results from the equation $$m = k+i+n. \quad (16)$$

The value $k/|\beta|$ is used as a good approximation value for the sum n+i. From this follows that $$m = k+k/|\beta|, \text{ or } m = (1+1/|\beta|). \quad (17)$$

Resolving this equation for k results in:

$$k = m/(1+1/|\beta|), \quad (18)$$

with k a natural number, as stated above. With the above stated values for $A_G=120$ μm, $\beta=-2$ and t=20 μm, the following is obtained:

$$A_G*(|\beta|*t) = m = 120\ \mu m*(2+1)/2*20\ \mu m) = 9. \quad (19)$$

From this follows:

$$k*(1+1/|\beta|) = m = 9, \quad (20)$$

from which results that k=6 and n+i=3.

Since the condition that i, k and n are natural numbers is met by the equation (20), therefore a lens array with a period, or a distance between the adjoining lenses of the lens array $A_G=120$ μm meets the requirements of an equiphase grating image. FIG. 3 makes it clear that a lens array 80a of a period of $A_G=120$ μm, whose adjoining lenses have the optical axes $X_1$ to $X_4$, results in a grating image $G_a$ with an undisturbed image of the scale grating 10.

If instead a distance between adjoining lenses, or a period of $A_G=140$ μm, is selected for a lens array 80b, which would meet the requirement of a minimum lens width of 120 μm, it follows from the above equation (12) that $$A_G=|\beta|(t*(k+i+n)+\Psi)/(|\beta|+1) \qquad (20)$$

wherein i, k and n must be natural numbers.

From this, the following results for a phase shift Ψ:

$$\Psi=(|\beta|+1)*A_G/|\beta|-t*(k+i+n) \qquad (21)$$

With the selected or assumed values for the lens distance $A_G=140$ μm, the image magnification factor β=−2, the grating scale grating t=20 μm and the natural numbers k=6 and n+i=3, the phase shift Ψ is obtained from the following equation:

$$\Psi=(2+1)*140 \text{ μm}-20 \text{ μm}*(6+3)240 \text{ μm} \qquad (22)$$

Figure 4:
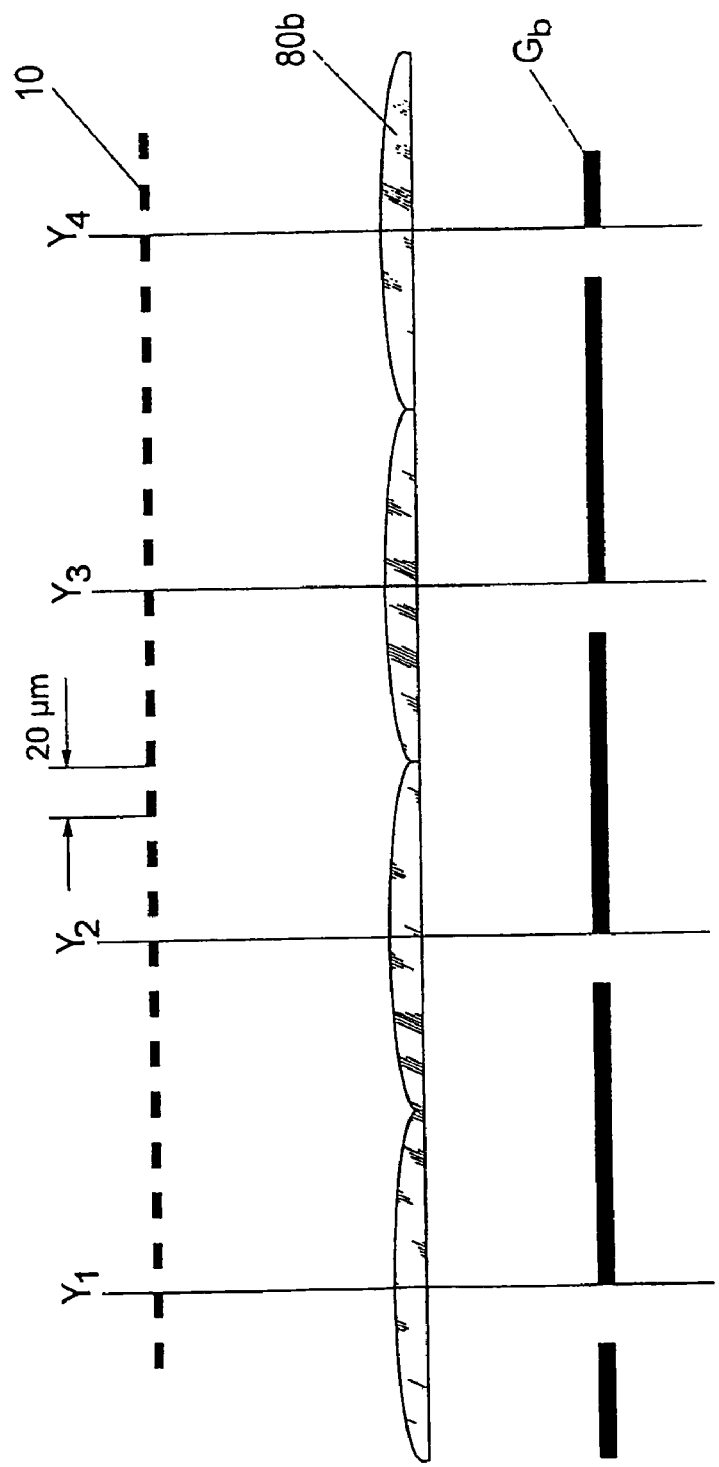
FIG. 4 is a schematic representation of an image of a periodic grating structure by a linear lens array to be used with the optical position measuring system of FIG. 1 of a periodicity not corresponding to the dimensioning rule in accordance with the present invention.

As can be seen from the grating image $G_b$ of the lens array 80b with a mutual distance between the optical axes $Y_1$ to $Y_4$ of adjoining lenses, or a period $A_G=140$ μm, represented in FIG. 4, the image areas between the adjoining lenses overlap, so that an extended area without represented scale gratings is created.

FIG. 5 schematically represents a radial grating structure 10, which is imaged by means of a radial lens array 80c in a radial grating image $G_{br}$.

The radial lens array 80c includes of individual micro-lenses which, in contrast to a linear lens array, do not have a constant distance $A_G$ along their radial longitudinal extension, but instead have a distance $A_G(r)$, which is changeable in the radial direction and is a function of the respective radius r.

For optically imaging the radial grating structure to be imaged, with the period t(r) with the image magnification factor β(r) by means of the radial lens array 80c, in such a way that a grating with the period $T(r)=|\beta(r)|*t(r)$, which has no phase shifts or phase gaps is created, the adjoining lenses of the radial lens array 80c must have a distance of $$A_G(r) = \frac{|\beta(r)| * t(r) * [k+i+n]}{(|\beta(r)|+1)}$$

wherein $A_G(r)$ is the grating period of the lens array,
t(r) the period of the periodic grating structure,
|β(r)| the absolute value of the image magnification factor β of the lens array 80c,
r the radius of the grating arrangement,
i, k, n ∈ N, i.e. natural numbers including zero.

FIG. 5 shows two distances $A_G(r1)$ and $A_G(r2)$, which are different and have been determined in accordance with the above dimensioning rule, between micro-lenses, located on the same radius, of two adjoining micro-lens arrangements on an identical radius and radially extending from a common center. Such a radial lens array can be used in connection with angle encoders and angle-measuring devices of radial position measuring systems.

Further embodiment variations of the method in accordance with the present invention of course exist besides the explained example.

We claim:

1. An optical position measuring system, comprising:
a periodic grating structure; and
a scanning unit comprising:
a light source that directs light towards said periodic grating structure;
an optical lens device that receives light from said periodic grating structure and creates an image of said periodic grating structure in an image plane, said optical lens device comprises a periodic lens array with a grating period, $A_G(r)$ or the mutual distance between adjoining lenses of said lens array defined by the equation:

$$A_G(r) = \frac{|\beta(r)| * [t(r) * [k+i+n] + \psi]}{(|\beta(r)|+1)}$$

wherein
$A_G(r)$ is the grating period of the lens array,
t(r) the period of the periodic grating structure,
|β(r)| the absolute amount of the image magnification factor β of the lens array
Ψ a presettable defined phase shift
r the radius of the grating arrangement, wherein in the case of a linear grating r=∞ and Ag, t, and |β| are constants,
i, k, n ∈ N, are natural numbers, including zero.

2. The optical position measurement system in accordance with claim 1, wherein said presettable defined phase shift Ψ is a fraction or a multiple of said period t(r) of said periodic grating structure imaged in said image plane.

3. The optical position measurement system in accordance with claim 1, wherein the grating period $A_G(r)$ of the lens array being defined by the condition said presettable defined phase shift Ψ=0° as follows:

$$A_G(r) = \frac{|\beta(r)| * t(r) * [k+i+n]}{(|\beta(r)|+1)}.$$

4. The optical position measurement system in accordance with claim 1, wherein a width, $B_L$, of lens of said lens array is defined by the equation:

$$B_L(r) = \frac{|\beta(r)| * t(r) * m}{(|\beta(r)|+1)}$$

with
$B_L(r)$ the lens width
t(r) the period of the periodic grating structure,
|(r)| the absolute amount of the image magnification factor β of the lens array
r the radius of the grating arrangement, which for r= ∞ defines a linear grating,
m ∈ N where m is the natural number, including zero.

5. The optical position measurement system in accordance with claim 1, wherein said scanning unit further comprises a photoelectrical detector arranged in said image plane.

6. The optical position measurement system in accordance with claim 1, wherein said image plane is assigned to an optical relay system.

7. The optical position measurement system in accordance with claim 1, wherein said optical lens device comprises a refractive optical element.

8. The optical position measurement system in accordance with claim 1, wherein said optical lens device comprises a diffractive optical element.

9. The optical position measurement system in accordance with claim 1, further comprising:
   a scale comprising a grating with a periodic grating structure;
   a scanning unit movable relative to said scale so as to scan said scale grating, said scanning unit comprising:
      a light source that generates a first beam of light directed towards said scale, wherein said scale generates a second beam of light based on said first beam of light and directs the second beam of light towards said scanning unit;
      an optical lens of said scanning unit that receives said second beam of light, wherein said optical lens device is arranged in a beam path of said second beam of light between said scale and an image plane, said optical lens creating an image of said periodic grating structure of said grating in an image plane located within said scanning unit.

10. The optical position measurement system in accordance with claim 9, wherein said scanning unit further comprises a scanning plate with a second grating structure, said scanning plate arranged in said beam path between said scale and said lens array, said second grating structure has grating constant slightly differing from a grating constant of said grating structure of said scale, so that a virtual strip pattern results in an intermediate image plane.

11. The optical position measurement system in accordance with claim 9, wherein said scanning unit further comprises a scanning plate with a second grating structure, said scanning plate arranged in said beam path between said scale and said light source, said second grating structure has grating constant slightly differing from a grating constant of said grating structure of said scale, so that a virtual strip pattern results in an intermediate image plane.

12. The optical position measurement system in accordance with claim 9, wherein said image plane and said light source are arranged on a common printed circuit board.

13. The optical position measurement system in accordance with claim 12, wherein said printed circuit board is arranged at an angle with respect to a plane of said scale in such a way that said first beam of light is: 1) reflected at a reflecting surface arranged perpendicularly with respect to said scale, 2) then cast onto said grating of said scale via a condenser lens, 3) then reflected by said grating of said scale and directed towards said lens array, which is substantially arranged parallel with said printed circuit board, and wherein image of said grating formed in said image plane is magnified by a factor $\beta$.

* * * * *